(12) United States Patent
Kawasato et al.

(10) Patent No.: US 6,710,999 B2
(45) Date of Patent: Mar. 23, 2004

(54) ELECTRIC DOUBLE LAYER CAPACITOR

(75) Inventors: Takeshi Kawasato, Yokohama (JP); Kazuya Hiratsuka, Yokohama (JP); Naoki Yoshida, Yokohama (JP); Katsuji Ikeda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/315,169

(22) Filed: Dec. 10, 2002

(65) Prior Publication Data

US 2003/0137798 A1 Jul. 24, 2003

(30) Foreign Application Priority Data

Dec. 11, 2001 (JP) ........................................ 2001-376888

(51) Int. Cl.⁷ .................................................. H01G 9/02
(52) U.S. Cl. ...................... 361/505; 361/502; 361/503; 361/523; 361/528; 429/129
(58) Field of Search ................................ 361/502, 503, 361/504, 508, 512, 528, 523, 518, 505, 509, 510, 511, 524, 516, 530; 429/129

(56) References Cited

U.S. PATENT DOCUMENTS

| | | | |
|---|---|---|---|
| 4,725,927 A | | 2/1988 | Morimoto et al. |
| 6,094,338 A | * | 7/2000 | Hirahara et al. |
| 6,424,517 B1 | | 7/2002 | Ikeda et al. |
| 6,452,782 B1 | * | 9/2002 | Otsuki et al. |
| 6,469,888 B1 | | 10/2002 | Otsuki et al. |

FOREIGN PATENT DOCUMENTS

| | | |
|---|---|---|
| DE | 100 51 132 A1 | 10/2000 |
| EP | 1033 728 A1 | 6/2000 |
| JP | 49-68254 | 7/1974 |
| JP | 62-237715 | 10/1987 |
| JP | 1-304719 | 12/1989 |
| JP | 3-203311 | 9/1991 |
| JP | 4-154106 | 5/1992 |
| JP | 4-286108 | 10/1992 |
| JP | 2001-21756 | 8/2001 |

OTHER PUBLICATIONS

U.S. Ser. No. 09/988,558 filed Nov. 20, 2001, pending.

U.S. Ser. No. 10/419,895 filed Apr. 22, 2003, Kawasato, et al.

U.S. Ser. No. 10/315,169 filed Dec. 10, 2002, Kawasato, et al.

\* cited by examiner

*Primary Examiner*—Dean A. Reichard
*Assistant Examiner*—Nguyen T. Ha
(74) *Attorney, Agent, or Firm*—Oblon, Spivak, McClelland, Maier & Neustadt, P.C.

(57) ABSTRACT

An electric double layer capacitor having a pair of polarized electrodes and an electrolytic solution capable of forming an electric double layer at the interface with the polarized electrodes, wherein the electrolytic solution contains a salt of the Formula 1 as the electrolyte and at least dimethyl carbonate as a solvent:

$$R^1R^2R^3R^4N^+X^- \qquad \text{Formula 1}$$

wherein $R^1$ is a n-propyl group and each of $R^2$, $R^3$ and $R^4$ which are independent of one another, is a methyl group or an ethyl group, provided that two selected from $R^1$ to $R^4$ may together form a tetramethylene group, and $X^-$ is an anion.

16 Claims, No Drawings

ELECTRIC DOUBLE LAYER CAPACITOR

The present invention relates to an electric double layer capacitor, particularly to an electric double layer capacitor having a low resistance, a high withstand voltage and excellent reliability.

As a shape of a conventional electric double layer capacitor, there may be a coin type wherein an element having a separator sandwiched between a pair of polarized electrodes composed mainly of activated carbon formed on current collectors, is accommodated together with an electrolytic solution in a metal casing, which is then sealed by a metal cover via a gasket, or a cylindrical type wherein an element having a pair of polarized sheet electrodes wound with a separator interposed therebetween, is accommodated together with an electrolytic solution in a metal casing, which is then sealed so that the electrolytic solution will not evaporate from an opening of the casing.

Further, as one for a large current and large capacitance, a lamination type electric double layer capacitor has also been proposed wherein an element having many polarized sheet electrodes laminated via a separator disposed therebetween, is incorporated (JP-A-4-154106, JP-A-3-203311, JP-A-4-286108). Namely, rectangular polarized sheet electrodes are used as a positive electrode and a negative electrode, and they are alternately laminated with a separator interposed therebetween, to form an element, which is then accommodated in a casing in such a state that a positive electrode lead member and a negative electrode lead member are connected by caulking to the terminals of the positive and negative electrodes, respectively, then the element is impregnated with an electrolytic solution, and the casing is closed with a cover.

As an electrolytic solution for a conventional electric double layer capacitor, not only an aqueous type electrolytic solution containing a mineral acid such as sulfuric acid, an alkali metal salt or an alkali, but also various non-aqueous electrolytic solutions have been used. As the solvent for such non-aqueous electrolytic solutions, propylene carbonate, γ-butyrolactone, acetonitrile, dimethyl formamide (JP-A-49-068254) or a sulfolane derivative (JP-A-62-237715), has been known. When the withstand voltages are compared, the aqueous type electrolytic solution has a withstand voltage of 0.8 V, while the non-aqueous electrolytic solution has a withstand voltage of from 2.5 to 3.3 V. The electrostatic energy of a capacitor corresponds to the square of the withstand voltage. Accordingly, from the viewpoint of the electrostatic energy, the non-aqueous type electrolyte is more advantageous. However, such a solvent having a high dielectric constant, in which an electrolyte is highly soluble, usually has a high viscosity and has a problem such that high electrical conductivity can not be obtained although an electrolytic solution having a high electrolyte concentration can be obtained. On the other hand, a chain ether, a chain ester or a chain carbonate, which is a low viscosity solvent, has a low dielectric constant and thus has a problem that it is substantially incapable of dissolving an electrolyte, whereby high electrical conductivity can not be obtained.

Propylene carbonate which is commonly used as a solvent for an electrolytic solution for an electric double layer capacitor, has a high dielectric constant and is a solvent, of which the viscosity is not relatively high. Thus, it is preferably employed. However, it has had a problem that propylene carbonate is likely to decompose when a voltage of about 2.9 V or higher is applied. Whereas, sulfolane which is electrochemically stable, has a high withstand voltage and will not be decomposed until a voltage as high as 3.4 V is applied, but it has had problems such that the solubility of an electrolyte is low, and the melting point is high.

Under these circumstances, it is an object of the present invention to study particularly an electrolytic solution to solve the above problems of the prior art and to provide an electric double layer capacitor having a high withstand voltage, a low resistance and excellent reliability.

The present invention provides an electric double layer capacitor having a pair of polarized electrodes and an electrolytic solution capable of forming an electric double layer at the interface with the polarized electrodes, wherein the electrolytic solution comprises a salt of the Formula 1 as the electrolyte and at least dimethyl carbonate as a solvent:

  Formula 1 wherein $R^1$ is a n-propyl group and each of $R^2$, $R^3$ and $R^4$ which are independent of one another, is a methyl group or an ethyl group, provided that two selected from $R^1$ to $R^4$ may together form a tetramethylene group, and $X^-$ is an anion.

Heretofore, as the cation of an electrolyte for an electrolytic solution for an electric double layer capacitor, $(C_2H_5)_4N^+$, $(C_2H_5)_4P^+$ or the like, which has high electrical conductivity, has been used. Also, $(C_2H_5)_3(CH_3)N^+$, which has a high solubility in a solvent, has been proposed, but no adequate solubility to a solvent having a low dielectric constant and low viscosity, has been obtained. Among solvents having a low dielectric constant and low viscosity, a chain carbonate is electrochemically stable, but dimethyl carbonate, ethylmethyl carbonate or the like has had a problem that it can not substantially dissolve an electrolyte by itself as a single solvent.

The electrolyte to be used for the electrolytic solution for the electric double layer capacitor of the present invention is a chain quaternary ammonium cation represented by $R^1R^2R^3R^4N^+$, wherein $R^1$ is a n-propyl group, and each of $R^2$, $R^3$ and $R^4$ which are independent of one another, is a methyl group or an ethyl group. Here, two selected from $R^1$ to $R^4$ may together form a tetramethylene group to provide a cyclic pyrrolidinium cation (each of the remaining two groups is the monovalent alkyl group as defined above).

Such a cation is electrochemically stable, and the electrolyte having such a cation has high solubility to dimethyl carbonate as a solvent having a low dielectric constant and a low viscosity. Accordingly, when a solution having such an electrolyte dissolved in dimethyl carbonate or in a solvent mixture containing dimethyl carbonate, is used as an electrolytic solution, it is possible to provide an electric double layer capacitor which is excellent in durability even when used for a long period of time and which thus has high reliability.

Among cations represented by $R^1R^2R^3R^4N^+$ in the Formula 1, a cation represented by any one of the following Formulae 2 to 6 may be mentioned as a specific preferred example:

  Formula 2

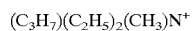  Formula 3

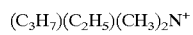  Formula 4

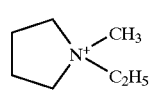  Formula 5

-continued

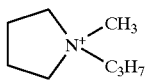

Formula 6

Among them, particularly preferred is a cation represented by any one of the Formulae 3 to 6, which contains three types of groups among a tetramethylene group, a n-propyl group, an ethyl group and a methyl group. The salt having a cation containing such three types of groups, has a high solubility to a solvent and can thus be highly concentrated, as compared with a salt having a cation containing two types of groups, and high electrical conductivity can be realized by making the electrolytic solution to be highly concentrated.

Further, if the carbon chain of the group bonded to the nitrogen atom is long, the solubility to a solvent increases, and the concentration can be made high, such being preferred. On the other hand, if the carbon chain of the group bonded to the nitrogen atom is long, the ion radius becomes large, and such ions tend to hardly enter into fine pores of the electrodes, whereby the amount of ions forming an electric double layer per unit volume, will be small, and from such a viewpoint, the shorter the carbon chain, the better. Specifically, particularly preferred is a salt having a cation represented by any one of the Formulae 2 to 6, wherein the average of the carbon chains of from $R^1$ to $R^4$ is about 2, in view of the solubility to a solvent, the amount of ions and the electrical conductivity of the solution.

The anion of the electrolyte contained in the electrolytic solution for the electric double layer capacitor of the present invention is preferably an anion selected from the group consisting of $BF_4^-$, $PF_6^-$, $CF_3SO_3^-$ and $(CF_3SO_2)_2N^-$. Particularly preferred is $BF_4^-$ from the viewpoint of e.g. the solubility to a solvent, the electric conductivity of the solution and the electrochemical stability.

In the present invention, the solvent for the electrolytic solution may be composed solely of dimethyl carbonate, but is preferably a solvent mixture of dimethyl carbonate with other solvents. As such other solvents, known solvents may be used. For example, a cyclic carbonate such as propylene carbonate, ethylene carbonate or butylene carbonate, a chain carbonate such as ethylmethyl carbonate or diethyl carbonate, a cyclic lactone such as γ-butyrolactone or γ-valerolactone, a nitrile such as acetonitrile or glutaronitrile, a sulfolane derivative such as 3-methylsulfolane, dimethylformamide, 1,2-dimethoxyethane, nitromethane and trimethylphosphate, may, for example, be mentioned. It is preferred to use one or more of them.

Further, in the present invention, the solubility of the electrolyte to dimethyl carbonate is high, whereby a solvent having an extremely low polarity, which could not be used heretofore; may be incorporated to the electrolytic solution.

In the electric double layer capacitor of the present invention, it is particularly preferred to use, as the solvent for the electrolytic solution, a solvent mixture of dimethyl carbonate with a solvent having a high withstand voltage and a large dielectric constant. Specifically, a solvent mixture comprising dimethyl carbonate, and sulfolane or butylene carbonate, is preferred.

The electrical conductivity of the electrolytic solution having dimethyl carbonate combined as a solvent with the electrolyte in the present invention, reaches the maximum when the concentration of the electrolyte is brought to a level of 2.2 mol/kg (in a case where the electrolyte represented by the following Formula 7, is employed) or to a level of 2.6 mol/kg (in a case where the electrolyte represented by the following Formula 8 is employed), and even if the concentration is further increased, the electrical conductivity will no longer increase. Further, if the concentration of the electrolyte is too high, the ammonium salt as the electrolyte is likely to precipitate in a cold atmosphere, whereby the stability is likely to deteriorate. On the other hand, if the concentration is too low, the internal resistance increases. For the above reasons, the concentration of the electrolyte is preferably from 1.4 to 2.5 mol/kg in a case where the electrolyte represented by the following Formula 7 is employed, or from 1.8 to 3.0 mol/kg in a case where the electrolyte represented by the following Formula 8 is employed, particularly preferably, the concentration of the electrolyte is made to be from 1.6 to 2.2 mol/kg or from 2.0 to 2.6 mol/kg, respectively. By the mass ratio, the proportion of the electrolyte is preferably from 30 to 60% in the total mass of the electrolytic solution.

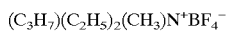

Formula 7

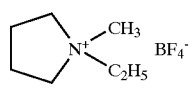

Formula 8

On the other hand, dimethyl carbonate is contained preferably in an amount of from 20 to 70% in the total mass of the electrolytic solution. When the solvent of the electrolytic solution is composed solely of dimethyl carbonate, the proportion of dimethyl carbonate is preferably from 40 to 70%. However, in the case of a solvent mixture of dimethyl carbonate with other solvents, it is preferred to adjust the proportion of dimethyl carbonate to be at least 20%, while maintaining the proportion of the electrolyte to be from 30 to 60%. If dimethyl carbonate is less than 20%, the solubility of the electrolyte tends to be low, and the concentration of the electrolyte may not be sufficiently increased.

In a case where a solvent mixture of dimethyl carbonate with sulfolane is used as the solvent for the electrolytic solution, the electrical conductivity will be higher than the case where dimethyl carbonate is used alone as the solvent. In such a case, sulfolane is contained preferably in an amount of at most 30%, particularly preferably at most 25%, in the total mass of the electrolytic solution. If the content of sulfolane exceeds 30%, it tends to be difficult to increase the concentration of the electrolyte. Further, it is preferred to have sulfolane contained in an amount of at least 5%, particularly preferably at least 15%, by mass ratio, so that the effect for increasing the electrical conductivity can readily be obtained.

Further, in a case where a solvent mixture of dimethyl carbonate with butylene carbonate is used as the solvent for the electrolytic solution, the electrical conductivity will be higher than the case where dimethyl carbonate is used alone as the solvent, such being preferred. In such a case, it is preferred to have butylene carbonate contained in an amount of at most 50%, particularly preferably at most 40%, in the total mass of the electrolytic solution. If the content of butylene carbonate exceeds 50%, it tends to be difficult to increase the concentration of the electrolyte. Further, it is preferred to have butylene carbonate contained in an amount of at least 20%, particularly preferably at least 30%, by mass ratio, so that the effect for increasing the electrical conductivity can readily be obtained.

The electrolytic solution in the present invention is a non-aqueous electrolytic solution, and the smaller the metal impurities and water content, the better. Usually, one having a water content of at most 10 ppm, is suitably employed.

The polarized electrodes to be used for the electric double layer capacitor of the present invention may be ones made mainly of an electrochemically inactive material having a high specific surface area, specifically those made mainly of activated carbon, fine metal particles or fine electrically conductive oxide particles. Among them, it is preferred to use those having an electrode layer comprising a powder of carbon material having a high specific surface area such as activated carbon, formed on the surface of metal current collectors.

Specifically, the electrode layer is formed preferably by using, as the main component, a powder of carbon material such as activated carbon or polyacene having a large specific surface area (specific surface area: about 200 to 3,000 $m^2/g$), adding thereto carbon black, acetylene black, Ketjenblack or carbon whisker as a conductive material, and polytetrafluoroethylene (PTFE), polyvinylidene fluoride (PVdF) or carboxymethylcellulose as a binder, kneading the mixture in the presence of a liquid lubricant such as an alcohol, molding the mixture into a sheet by rolling, followed by drying to obtain a sheet-form molded product, which is bonded by heat pressing or bonded by means of an electrically conductive adhesive or the like to both sides of a metal current collector.

Further, instead of kneading, a solvent capable of dissolving the above binder or a solvent mixture containing such a solvent (water, N-methylpyrrolidone, etc.) may be mixed with activated carbon, a conductive agent and a binder to obtain a slurry, which may be coated on both sides of a metal current collector and dried to form the electrode layer. The thickness of such an electrode layer is not particularly limited, but is usually from about 10 $\mu$m to 0.5 mm.

As the activated carbon material, one derived from a natural plant tissue such as coconut shell, a synthetic resin such as a phenolic resin or a fossil fuel such s coal, coke or pitch, may be employed. As an activating method for activated carbon, steam activation or alkali activation (particularly activation by KOH) may be applied, although it may vary depending upon the raw material to be employed. Activated carbon derived from a natural plant tissue or a fossil fuel, contains a relatively large amount of metal impurities, and accordingly, washing with e.g. an acid is usually required. Similarly, activated carbon obtained by alkali activation contains a large amount of an alkali metal used for the activation or metal impurities brought from an activation apparatus due to the reaction with the alkali, and accordingly a washing operation will be required. Among them, steam activated carbon made of a synthetic resin as a raw material, is most preferred from the viewpoint of metal impurities.

The element construction of the electric double layer capacitor of the present invention is not particularly limited, and the present invention can be applied to any one of a coin type structure, a cylindrical structure or an angular structure. For example, the coin type structure may be formed in such a manner that an element is formed by disposing a separator between a pair of electrodes having electrode layers composed mainly of activated carbon provided on current collectors, and the element is, together with an electrolytic solution, sealed in a coin type metal casing by a metal cover and a gasket which insulates both.

Whereas, the cylindrical structure may be formed, for example, in such a manner that a pair of strip-shaped electrodes, specifically a strip-shaped positive electrode having an electrode layer composed mainly of e.g. activated carbon formed on both sides of a metal current collector and a strip-shaped negative electrode having an electrode layer of the same construction formed on both sides of a metal current collector, are alternately laminated via a strip-shaped separator and wound to obtain a wound element, which is then accommodated in a cylindrical metal casing and impregnated with the electrolytic solution, whereupon the current collecting leads taken out from the positive electrode and the negative electrode, respectively, are connected, respectively, to the electrode terminals provided, for example, on an electrically insulating sealing cover, and the sealing cover is fit to the metal casing.

The angular structure may be formed in such a manner that electrode layers are formed on both sides of a rectangular metal current collector, a plurality of positive electrodes and a plurality of negative electrodes, each provided with a current collecting lead, are alternately laminated via a separator, to form a laminated element having current collecting leads taken out, which is accommodated in an angular metal casing and impregnated with the electrolytic solution, whereupon a sealing cover is fit on the angular casing.

The current collector may be made of any metal so long as it is electrochemically or chemically corrosion resistant. In the case of a coin type structure, the housing member such as the metal sealing cover or the metal casing, may serve as a current collector, in many cases. As the current collector in the case of the cylindrical structure or the angular structure, it is preferred to employ a surface-roughened foil or net made of a metal such as aluminum, stainless steel, nickel or tantalum, particularly a foil or net made of a stainless steel, aluminum or an alloy containing it. More preferred is an aluminum foil having a purity of 99.9%, particularly preferably 99.99%. In the present invention, it is preferred to employ a metal current collector made of such a metal foil and having a thickness of from 10 $\mu$m to 0.5 mm.

In the case of a cylindrical structure or an angular structure, current collecting leads will be provided to the metal current collectors. It is preferred to provide a tape- or ribbon-shaped portion on a current collector having no electrode layer formed thereon and to bond an electrically conductive tab terminal, wire, tape, ribbon or the like by e.g. welding to such a portion to form a current collecting lead. Otherwise, a portion having no electrode layer formed, is provided at a part of a current collector, so that such a portion may be used as a current collecting lead. Specifically, for example, in the case of a cylindrical structure, a strip portion having no electrode layer formed, may be provided along one end in the longitudinal direction of a strip current collector, and the counter electrode is overlaid via a separator so that the strip portion is located at the opposite end, and the assembly is wound to obtain an element, whereby both end surfaces (the above strip portions) of the element can be used as current collecting leads.

The separator of the present invention is not particularly limited, so long as it is a porous separator so that ions can permeate therethrough. A fine porous polyethylene film, a fine porous polypropylene film, a polyethylene non-woven fabric, a polypropylene non-woven fabric, a polypropylene non-woven fabric, a glass fiber incorporated non-woven fabric, a glass mat, cellulose paper, craft pulp, sisal hemp or Manila hemp, may, for example, be preferably employed. The thickness of the separator is preferably from 20 to 200 $\mu$m, particularly preferably from 30 to 100 $\mu$m. From the viewpoint of the absorptivity for the electrolytic solution, the liquid maintaining property and the internal resistance, the higher the porosity, the better. However, as the porosity is high, defects such as pinholes are likely to increase, thus leading to self discharge failure. Accordingly, the porosity is usually preferably within a range of from 50 to 90%, more preferably within a range of from 60 to 85%.

Now, the present invention will be described in further detail with reference to Examples and Comparative Examples. However, it should be understood that the present invention is by no means restricted by such specific Examples.

EXAMPLE 1

Ethanol was added to a mixture comprising a phenol resin type activated carbon having a specific surface area of 2,000 m$^2$/g, activated by steam, polytetrafluoroethylene and carbon black in a mass ratio of 8:1:1, followed by kneading and forming into a sheet shape, and then by rolling into a thickness of 0.6 mm to obtain an electrode sheet, whereupon the sheet was punched into disks having a diameter of 12 mm.

Such disk-shaped electrodes were bonded to the positive electrode side and negative electrode side insides, respectively, of a stainless steel casing serving as a current collector and a housing member for a coin-shaped cell by means of a graphite type conductive adhesive. Then, the entire assembly including the stainless steel casing was subjected to heat treatment under reduced pressure to remove moisture, etc. The electrodes were impregnated with an electrolytic solution having 1.6 mol/kg of $(C_3H_7)(C_2H_5)_3N^+BF_4^-$ dissolved in a solvent mixture comprising dimethyl carbonate and sulfolane in a mass ratio of 7:3. A separator (thickness: 160 μm, porosity: 70%) of a non-woven fabric made of polypropylene fiber was sandwiched between the two electrodes, and the stainless steel casing was caulked via a gasket as an insulator and sealed, to obtain a coin-shaped electric double layer capacitor having a diameter of 18.4 mm and a thickness of 2.0 mm.

EXAMPLE 2

A coin-shaped electric double layer capacitor was obtained in the same manner as in Example 1 except that as the electrolytic solution, a solution having 1.4 mol/kg of $(C_3H_7)(C_2H_5)_3N^+BF_4^-$ dissolved in a solvent mixture comprising dimethyl carbonate and butylene carbonate in a mass ratio of 1:1, was used.

EXAMPLE 3

Ethanol was added to a mixture comprising a phenol resin type activated carbon having a specific surface area of 2,000 m$^2$/g, activated by molten KOH, polytetrafluoroethylene and carbon black in a mass ratio of 8:1:1, followed by kneading and forming into a sheet shape, and then by rolling into a thickness of 0.1 mm to obtain a strip electrode sheet. The obtained electrode sheet was bonded by an electrically conductive adhesive to an aluminum foil having the surface etched. Two such sheets were prepared and used as a positive electrode and a negative electrode. A glass fiber separator (thickness: 100 μm, porosity: 80%) was sandwiched between the positive electrode and the negative electrode and subjected to heat treatment under reduced pressure to remove moisture, etc. and wound up on a winding core having a diameter of 2 mm to obtain a cylindrical element having a diameter of 7 mm and a height of 20 mm. This element was impregnated with an electrolytic solution having 2.0 mol/kg of $(C_3H_7)(C_2H_5)_2(CH_3)N^+BF_4^-$ dissolved in dimethyl carbonate. Butyl rubber as a cover was inserted, and sealing was carried out by a caulking tool to obtain a cylindrical type electric double layer capacitor.

EXAMPLE 4

A cylindrical type electric double layer capacitor was obtained in the same manner as in Example 3 except that as the electrolytic solution, a solution having 1.6 mol/kg of $(C_3H_7)(C_2H_5)_2(CH_3)N^+PF_6^-$ dissolved in dimethyl carbonate, was used.

EXAMPLE 5

Disk-shaped electrodes having a thickness of 0.6 mm and a diameter of 12 mm were obtained in the same manner as in Example 1 except that as the activated carbon, activated carbon having a specific surface area of 2,000 m$^2$/g, which was obtained by firing a resol resin in a nitrogen atmosphere at 650° C., followed by melt KOH activation, was used, and further, a coin-shaped electric double layer capacitor having a diameter of 18.4 mm and a thickness of 2.0 mm, was obtained in the same manner as in Example 1 except that as the electrolytic solution, a solution having 2.0 mol/kg of $(C_3H_7)(C_2H_5)_2(CH_3)N^+BF_4^-$ dissolved in a solvent mixture comprising dimethyl carbonate and butylene carbonate in a mass ratio of 8:2, was used.

EXAMPLE 6

A coin-shaped electric double layer capacitor was obtained in the same manner as in Example 1 except that as the electrolytic solution, a solution having 2.0 mol/kg of $(C_3H_7)(C_2H_5)(CH_3)_2N^+BF_4^-$ dissolved in dimethyl carbonate, was used.

EXAMPLE 7

A coin-shaped electric double layer capacitor was obtained in the same manner as in Example 1 except that as the electrolytic solution, a solution having 2.0 mol/kg of the compound represented by the above Formula 8 dissolved in dimethyl carbonate, was used.

EXAMPLE 8

A coin-shaped electric double layer capacitor was obtained in the same manner as in Example 1 except that as the electrolytic solution, a solution having 2.0 mol/kg of the compound represented by the above Formula 8 dissolved in a solvent mixture comprising dimethyl carbonate and sulfolane in a mass ratio of 7:3, was used.

EXAMPLE 9

A coin-shaped electric double layer capacitor was obtained in the same manner as in Example 1 except that as the electrolytic solution, a solution having 2.2 mol/kg of the compound represented by the following Formula 9 dissolved in dimethyl carbonate, was used.

Formula 9

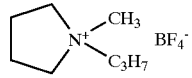

EXAMPLE 10

A cylindrical type electric double layer capacitor was obtained in the same manner as in Example 3 except that as the electrolytic solution, the same solution as used in Example 9, was used.

EXAMPLE 11

A cylindrical type electric double layer capacitor was obtained in the same manner as in Example 3 except that as the electrolytic solution, a solution having 2.2 mol/kg of the compound represented by the above Formula 9 dissolved in a solvent mixture comprising dimethyl carbonate and butylene carbonate in a mass ratio of 1:1, was used.

EXAMPLE 12

A coin-shaped electric double layer capacitor was obtained in the same manner as in Example 5 except that as the electrolytic solution, a solution having 2.0 mol/kg of the compound represented by the above Formula 8 dissolved in a solvent mixture comprising dimethyl carbonate and butylene carbonate in a mass ratio of 1:1, was used.

EXAMPLE 13

Compartive Example

A coin-shaped electric double layer capacitor was obtained in the same manner as in Example 1 except that as the electrolytic solution, a solution having 1.6 mol/kg of $(C_2H_5)_3(CH_3)N^+BF_4^-$ dissolved in propylene carbonate, was used.

EXAMPLE 14

Comparative Example

A coin-shaped electric double layer capacitor was obtained in the same manner as in Example 1 except that as the electrolytic solution, a solution having 1.0 mol/kg of $(C_2H_5)_3(CH_3)N^+BF_4^-$ dissolved in a solvent mixture comprising dimethyl carbonate and sulfolane in a volume ratio of 7:3, was used.

EXAMPLE 15

Comparative Example

A coin-shaped electric double layer capacitor was obtained in the same manner as in Example 1 except that as the electrolytic solution, a solution having 1.6 mol/kg of $(C_3H_7)(C_2H_5)_3N^+BF_4^-$ dissolved in propylene carbonate, was used.

EXAMPLE 16

Comparative Example

A cylindrical type electric double layer capacitor was obtained in the same manner as in Example 3 except that as the electrolytic solution, a solution having 1.4 mol/kg of $(C_3H_7)(C_2H_5)_2(CH_3)N^+BF_4^-$ dissolved in propylene carbonate, was used.

EXAMPLE 17

Comparative Example

A coin-shaped electric double layer capacitor was obtained in the same manner as in Example 1 except that as the electrolytic solution, a solution having 1.8 mol/kg of the compound represented by the above Formula 8 dissolved in propylene carbonate, was used.

EXAMPLE 18

Comparative Example

A cylindrical type electric double layer capacitor was obtained in the same manner as in Example 3 except that as the electrolytic solution, a solution having 1.4 mol/kg of the compound represented by the above Formula 9 dissolved in propylene carbonate, was used.

Firstly, the solubility of various electrolytes (quaternary ammonium salts wherein the anion is $BF_4^-$) in dimethyl carbonate (DMC) was ascertained, and with respect to those which were soluble, the electrical conductivity of the solutions was measured. The results are shown in Table 1. Further, with respect to electrolytes having cations represented by $(C_3H_7)(C_2H_5)_3N^+$, $(C_3H_7)(C_2H_5)_2(CH_3)N^+$ and the above Formulae 5 and 6 which had high solubilities, their solubilities were ascertained by changing the concentrations. As is apparent from Table 1, the electrolytes in the present invention have high solubilities in dimethyl carbonate having a low dielectric constant and a low viscosity and exhibit high electrical conductivities.

Now, the compositions of the electrolytic solutions in various electric double layer capacitors of Examples 1 to 12 and the electrical conductivities of the respective electrolytic solutions at 25° C. are shown in Table 2, and the compositions of the electrolytic solutions in various electric double layer capacitors of Examples 13 to 18, and the electrical conductivities of the respective electrolytic solutions at 25° C., are shown in Table 3.

Further, to the electric double layer capacitors of Examples 1 to 18, the voltages as identified in Table 4 were, respectively, applied, whereby the initial capacitance and the internal resistance were measured. Further, they were maintained in a constant temperature and humidity tank at 70° C. for 1,000 hours under application of the voltages, whereupon the change in the capacitance was measured. The results are shown in Table 4. Table 4 shows that with the electric double layer capacitors in the Examples of the present invention, the change in capacitance is small as compared with the Comparative Examples. This is considered attributable to the fact that the capacitors of the present invention are excellent in resistance against hydrolysis.

TABLE 1

| Cation of electrolyte (anion being $BF_4^-$ in all cases) | Concentration mol/kg | Solubility in DMC | Electrical conductivity mS/cm |
|---|---|---|---|
| $(C_2H_5)_4N^+$ | 0.5 | Precipitated | — |
| $(C_2H_5)_3(CH_3)N^+$ | 0.5 | Precipitated | — |
| $(C_3H_7)(C_2H_5)_3N^+$ | 1.0 | Dissolved | 8.5 |
|  | 1.5 | Dissolved | 12.8 |
|  | 2.0 | Precipitated | — |
| $(C_3H_7)(C_2H_5)_2(CH_3)N^+$ | 1.5 | Dissolved | 12.0 |
|  | 2.0 | Dissolved | 14.7 |
|  | 2.5 | Dissolved | 14.2 |
| $(C_3H_7)(C_2H_5)(CH_3)_2N^+$ | 2.0 | Dissolved | 14.8 |
| $(C_3H_7)_4N^+$ | 0.5 | Precipitated | — |
| 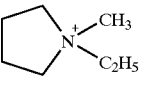 | 2.0 | Dissolved | 18.8 |
|  | 2.6 | Dissolved | 20.9 |
|  | 2.8 | Dissolved | 20.9 |
|  | 1.8 | Dissolved | 15.2 |
|  | 2.6 | Dissolved | 17.3 |
|  | 3.0 | Dissolved | 16.0 |

TABLE 2

| | Components of electrolytic solution | Compositional ratio mass % | Electrical conductivity mS/cm |
|---|---|---|---|
| Ex. 1 | $(C_3H_7)(C_2H_5)_3N^+BF_4^-$ | 37.0 | 13.1 |
| | Dimethyl carbonate | 44.1 | |
| | Sulfolane | 18.9 | |
| Ex. 2 | $(C_3H_7)(C_2H_5)_3N^+BF_4^-$ | 32.4 | 13.6 |
| | Dimethyl carbonate | 33.8 | |
| | Butylene carbonate | 33.8 | |
| Ex. 3 | $(C_3H_7)(C_2H_5)_2(CH_3)N^+BF_4^-$ | 43.6 | 14.7 |
| | Dimethyl carbonate | 56.4 | |
| Ex. 4 | $(C_3H_7)(C_2H_5)_2(CH_3)N^+PF_6^-$ | 42.7 | 14.5 |
| | Dimethyl carbonate | 57.3 | |
| Ex. 5 | $(C_3H_7)(C_2H_5)_2(CH_3)N^+BF_4^-$ | 43.6 | 14.8 |
| | Dimethyl carbonate | 45.1 | |
| | Butylene carbonate | 11.3 | |
| Ex. 6 | $(C_3H_7)(C_2H_5)(CH_3)_2N^+BF_4^-$ | 40.6 | 14.8 |
| | Dimethyl carbonate | 59.9 | |
| Ex. 7 | N-methyl-N-ethyl pyrrolidinium $BF_4^-$ | 40.2 | 18.8 |
| | Dimethyl carbonate | 59.8 | |
| Ex. 8 | N-methyl-N-ethyl pyrrolidinium $BF_4^-$ | 40.2 | 17.4 |
| | Dimethyl carbonate | 41.9 | |
| | Butylene carbonate | 17.9 | |
| Ex. 9 Ex. 10 | N-methyl-N-propyl pyrrolidinium $BF_4^-$ | 47.3 | 16.8 |
| | Dimethyl carbonate | 52.7 | |
| Ex. 11 | N-methyl-N-propyl pyrrolidinium $BF_4^-$ | 47.3 | 15.6 |
| | Dimethyl carbonate | 26.4 | |
| | Butylene carbonate | 26.4 | |
| Ex. 12 | N-methyl-N-ethyl pyrrolidinium $BF_4^-$ | 40.2 | 18.0 |
| | Dimethyl carbonate | 29.9 | |
| | Butylene carbonate | 29.9 | |

TABLE 3

| | Components of electrolytic solution | Compositional ratio mass % | Electrical conductivity mS/cm |
|---|---|---|---|
| Ex. 13 | $(C_2H_5)_3(CH_3)N^+BF_4^-$ | 32.5 | 16.9 |
| | Propylene carbonate | 67.5 | |
| Ex. 14 | $(C_2H_5)_3(CH_3)N^+BF_4^-$ | 20.3 | 11.2 |
| | Dimethyl carbonate | 55.8 | |
| | Sulfolane | 23.9 | |
| Ex. 15 | $(C_3H_7)(C_2H_5)_3N^+BF_4^-$ | 37.0 | 13.5 |
| | Propylene carbonate | 63.0 | |
| Ex. 16 | $(C_3H_7)(C_2H_5)_2(CH_3)N^+BF_4^-$ | 30.5 | 14.0 |
| | Propylene carbonate | 69.5 | |
| Ex. 17 | N-methyl-N-ethyl pyrrolidinium $BF_4^-$ | 36.2 | 17.0 |
| | Propylene carbonate | 63.8 | |
| Ex. 18 | N-methyl-N-ethyl pyrrolidinium $BF_4^-$ | 30.1 | 15.3 |
| | Propylene carbonate | 69.9 | |

TABLE 4

| | Applied voltage | Capacitance | Internal resistance | Change in capacitance |
|---|---|---|---|---|
| Ex. 1 | 3.3 V | 2.71 F | 9.8 Ω | −15.2% |
| Ex. 2 | 3.3 V | 2.76 F | 9.1 Ω | −18.3% |
| Ex. 3 | 3.0 V | 4.22 F | 360 mΩ | −14.9% |
| Ex. 4 | 3.0 V | 4.24 F | 320 mΩ | −19.8% |
| Ex. 5 | 3.3 V | 2.82 F | 8.6 Ω | −17.3% |
| Ex. 6 | 3.3 V | 2.80 F | 8.5 Ω | −16.0% |
| Ex. 7 | 3.3 V | 2.88 F | 6.8 Ω | −16.3% |
| Ex. 8 | 3.3 V | 2.83 F | 7.9 Ω | −17.9% |
| Ex. 9 | 3.3 V | 2.79 F | 8.0 Ω | −15.5% |
| Ex. 10 | 3.0 V | 4.30 F | 270 mΩ | −15.2% |
| Ex. 11 | 3.0 V | 4.20 F | 290 mΩ | −19.7% |
| Ex. 12 | 3.3 V | 2.85 F | 7.5 Ω | −18.2% |
| Ex. 13 | 3.3 V | 2.68 F | 8.2 Ω | −48.8% |
| Ex. 14 | 3.3 V | 2.50 F | 16.9 Ω | −22.4% |
| Ex. 15 | 3.3 V | 2.63 F | 8.9 Ω | −39.7% |
| Ex. 16 | 3.0 V | 4.15 F | 390 mΩ | −37.4% |
| Ex. 17 | 3.3 V | 2.71 F | 7.9 Ω | −41.8% |
| Ex. 18 | 3.0 V | 4.20 F | 310 mΩ | −39.3% |

As described in the foregoing, the electrolytic solution in the present invention has a low resistance and a high withstand voltage and undergoes no substantial change in the capacitance even when a voltage is applied for a long period of time. Accordingly, according to the present invention, it is possible to provide an electric double layer capacitor having a low resistance, a high withstand voltage and excellent reliability.

The entire disclosure of Japanese Patent Application No. 2001-376888 filed on Dec. 11, 2001 including specification, claims and summary is incorporated herein by reference in its entirety.

What is claimed is:

1. An electric double layer capacitor comprising:

a pair of polarized electrodes and an electrolytic solution capable of forming an electric double layer at the interface with the polarized electrodes;

wherein the electrolytic solution comprises a salt of Formula 2, Formula 3, Formula 4, Formula 5, or Formula 6 as the electrolyte and at least dimethyl carbonate as a solvent $(C_3H_7)(C_2H_5)_3N^+X^-$      Formula 2

$(C_3H_7)(C_2H_5)_2(CH_3)N^+X^-$      Formula 3

$(C_3H_7)(C_2H_5)(CH_3)_2N^+X^-$      Formula 4

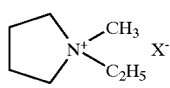 Formula 5

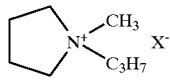 Formula 6 wherein X⁻ is an anion.

2. The electric double layer capacitor according to claim 1, wherein X⁻ is an anion selected from the group consisting of $BF_4^-$, $PF_6^-$, $CF_3SO_3^-$ and $(CF_3SO_2)_2N^-$.

3. The electric double layer capacitor according to claim 1, wherein the electrolyte is represented by Formula 7 or 8:

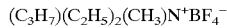 Formula 7

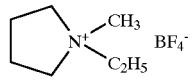 Formula 8

4. The electric double layer capacitor according to claim 1, wherein in the total mass of the electrolytic solution, the electrolyte is contained in an amount of from 30 to 60%, and the dimethyl carbonate is contained in an amount of from 20 to 70%.

5. The electric double layer capacitor according to claim 3, wherein in the total mass of the electrolytic solution, the electrolyte is contained in an amount of from 30 to 60%, and the dimethyl carbonate is contained in an amount of from 20 to 70%.

6. The electric double layer capacitor according to claim 1, wherein in the electrolytic solution, sulfolane is contained in an amount of at most 30% based on the total mass of the electrolytic solution.

7. The electric double layer capacitor according to claim 3, wherein in the electrolytic solution, sulfolane is contained in an amount of at most 30% based on the total mass of the electrolytic solution.

8. The electric double layer capacitor according to claim 1, wherein in the electrolytic solution, butylene carbonate is contained in an amount of at most 50% based on the total mass of the electrolytic solution.

9. The electric double layer capacitor according to claim 3, wherein in the electrolytic solution, butylene carbonate is contained in an amount of at most 50% based on the total mass of the electrolytic solution.

10. An electrolytic solution comprising a salt of Formula 2, Formula 3, Formula 4, Formula 5, or Formula 6 as the electrolyte and at least dimethyl carbonate as a solvent

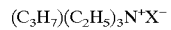 Formula 2

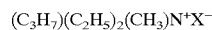 Formula 3

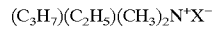 Formula 4

Formula 5

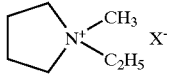

Formula 6

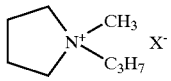

wherein X⁻ is an anion.

11. The electrolytic solution according to claim 10, wherein, X⁻ is an anion selected from the group consisting of $BF_4^-$, $PF_6^-$, $CF_3SO_3^-$ and $(CF_3SO_2)_2N^-$.

12. The electrolytic solution according to claim 11, wherein the electrolyte is represented by Formula 7 or 8:

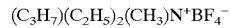 Formula 7

Formula 8

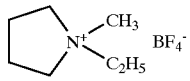

13. The electrolytic solution according to claim 10, wherein in the total mass, the electrolyte is contained in an amount of from 30 to 60%, and the dimethyl carbonate is contained in an amount of from 20 to 70%.

14. The electrolytic solution according to claim 12, wherein in the total mass, the electrolyte is contained in an amount of from 30 to 60%, and the dimethyl carbonate is contained in an amount of from 20 to 70%.

15. The electrolytic solution according to claim 10, wherein sulfolane is contained in an amount of at most 30% based on the total mass.

16. The electrolytic solution according to claim 10, wherein butylene carbonate is contained in an amount of at most 50% based on the total mass.

* * * * *